UNITED STATES PATENT OFFICE.

A. J. HINDERMEYER, OF ROHRERTOWN, PENNSYLVANIA.

IMPROVEMENT IN WELDING OR BRAZING.

Specification forming part of Letters Patent No. 59,222, dated October 30, 1866.

*To all whom it may concern:*

Be it known that I, ANTHONY J. HINDERMEYER, of Rohrertown, (Hempfield P. O.,) in the county of Lancaster, State of Pennsylvania, have invented a new and useful Flux for Welding and Brazing Steel, Iron, and other Metals; and I do hereby declare the following to be a full and exact description of the same.

The processes of welding or brazing with the application of my improved flux are, in detail and general manipulation, precisely as usual, without deviation from the ordinary handling of the metals well known to every blacksmith and practical metallurgist, and can, therefore, be fully and clearly understood without drawings. (Specimens of my improved flux accompany this application.)

My improvement is the result of a discovery made in the practical conduct of the trade of blacksmithing, which I have followed for a number of years. Having found great difficulty in welding certain qualities of steel, which with the use of the ordinary well-known kinds of flux would neither produce a sound weld nor retain the original quality and grain, I discovered that a kind of quartz abounding in this county, and known by the geological term of "chalcedony quartz," when reduced to a powder and applied in the same manner as borax and other known substances and compounds used as fluxes, would produce, without difficulty or more than ordinary care in handling, a perfectly sound weld in steel which had otherwise failed to weld. Steel welded by the use of this new flux was, after a series of invariably successful trials, closely examined and found in a perfectly healthy and unimpaired state. For welding steel upon iron or for welding iron to iron this flux serves also in the most satisfactory manner, and in every case where it has been applied in lieu of the ordinary fluxes it has produced highly useful and gratifying results.

What I claim as my invention, and desire to secure by Letters Patent, is—

The use of the herein-specified mineral substance as a flux for welding and brazing steel, iron, or other metals.

A. J. HINDERMEYER.

Witnesses:
ISAIAH MATLACK,
MATTHIAS MAAG.